(No Model.) 5 Sheets—Sheet 1.

C. H. BREIDENBACH & C. SMYTH.
CASH REGISTER.

No. 539,033. Patented May 14, 1895.

(No Model.) 5 Sheets—Sheet 2.

C. H. BREIDENBACH & C. SMYTH.
CASH REGISTER.

No. 539,033. Patented May 14, 1895.

(No Model.) 5 Sheets—Sheet 3.

C. H. BREIDENBACH & C. SMYTH.
CASH REGISTER.

No. 539,033. Patented May 14, 1895.

(No Model.) 5 Sheets—Sheet 4.

C. H. BREIDENBACH & C. SMYTH.
CASH REGISTER.

No. 539,033. Patented May 14, 1895.

WITNESSES:

INVENTORS
C. Henry Breidenbach.
Charles Smyth.
BY
R. Jay McCarty
ATTORNEY.

(No Model.) 5 Sheets—Sheet 5.

C. H. BREIDENBACH & C. SMYTH.
CASH REGISTER.

No. 539,033. Patented May 14, 1895.

WITNESSES:

INVENTORS.
C Henry Breidenbach
Charles Smyth
BY
R. Jay McCarty
ATTORNEY.

UNITED STATES PATENT OFFICE.

CHARLES HENRY BREIDENBACH AND CHARLES SMYTH, OF DAYTON, OHIO, ASSIGNORS OF ONE-THIRD TO F. A. TAFT, OF SAME PLACE.

CASH-REGISTER.

SPECIFICATION forming part of Letters Patent No. 539,033, dated May 14, 1895.

Application filed November 3, 1893. Serial No. 489,926. (No model.)

*To all whom it may concern:*

Be it known that we, CHARLES HENRY BREIDENBACH and CHARLES SMYTH, of Dayton, county of Montgomery, State of Ohio, have invented a new and useful Improvement in Cash-Registers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in cash registers and indicators.

The object of the invention is to provide a machine that is capable of indicating and computing the amounts registered, by the employment of comparatively few and simplified mechanical parts.

To these ends our invention consists of a series of peculiarly constructed levers and adjunctive mechanism operated thereby, to effect the discharge of circular checks or chips which fall by gravity to a lodgment behind numerals indicated on a panel of glass arranged transversely in the front of the machine. The chip and numeral being of contrasting colors, the latter is made plainly visible. Each chip so placed remains in an indicating position until the next depression of a lever, which releases the chip previously indicated and permits it to gravitate to a cylindrical receptacle provided therefor, and another chip is exposed corresponding in numerical value to the lever operated.

For a detailed description reference is made to the accompanying drawings, forming a part of the specification, upon which similar characters of reference indicate similar parts throughout the several views.

Figure 1:
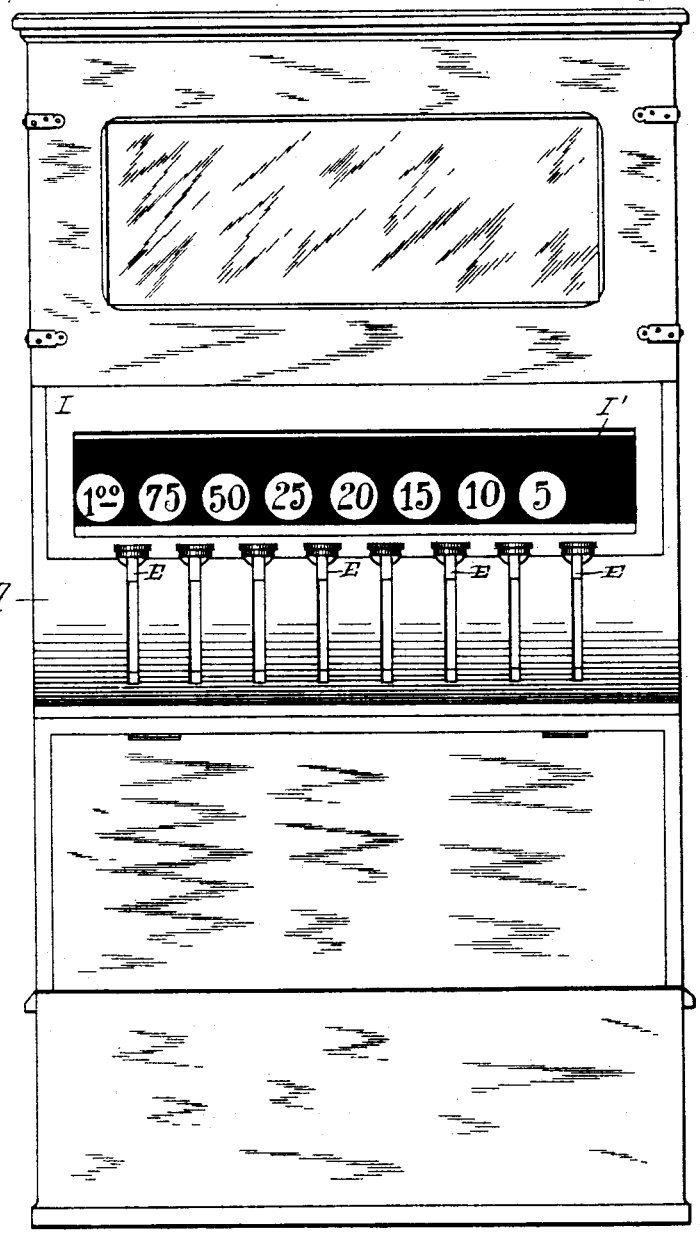
Figure 2:
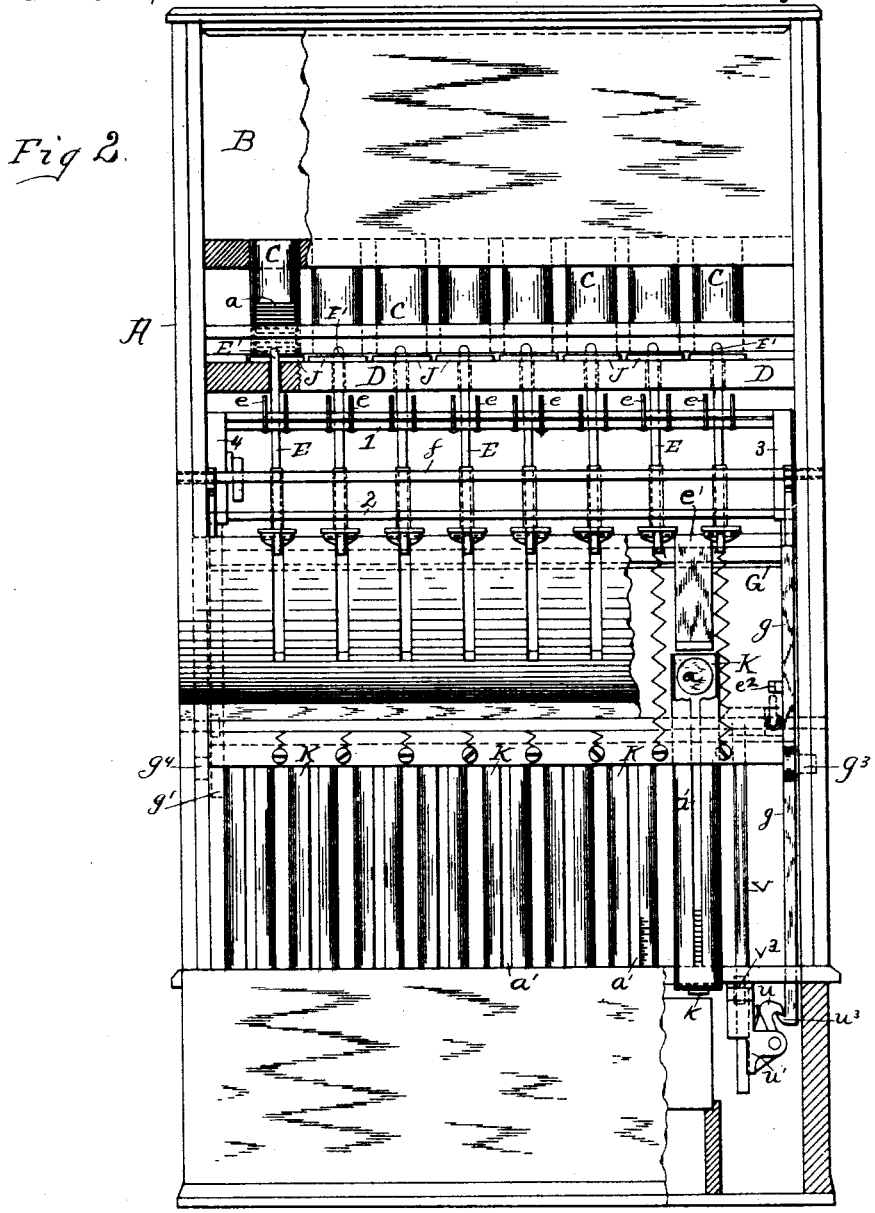
Figure 3:
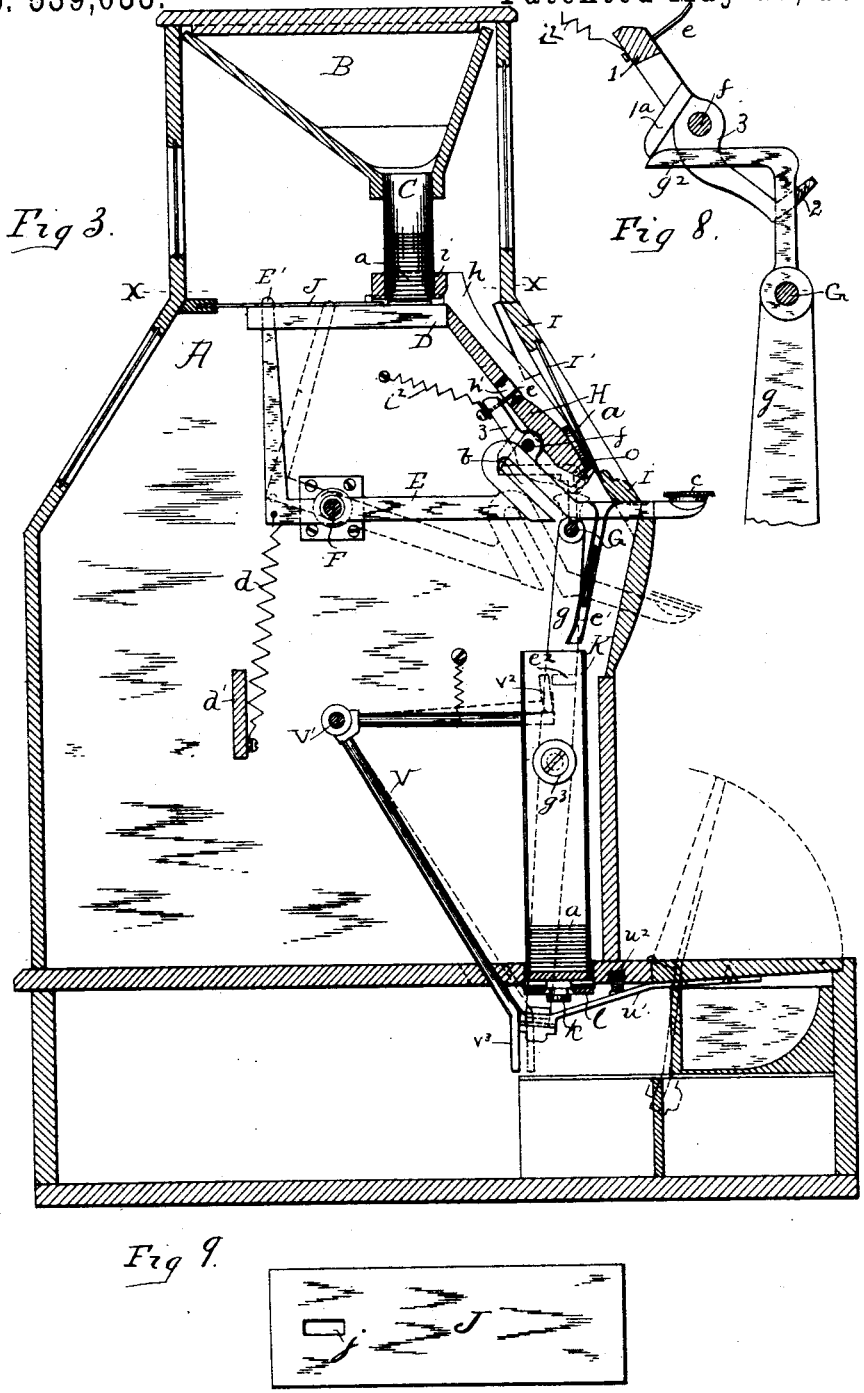
Figure 4:
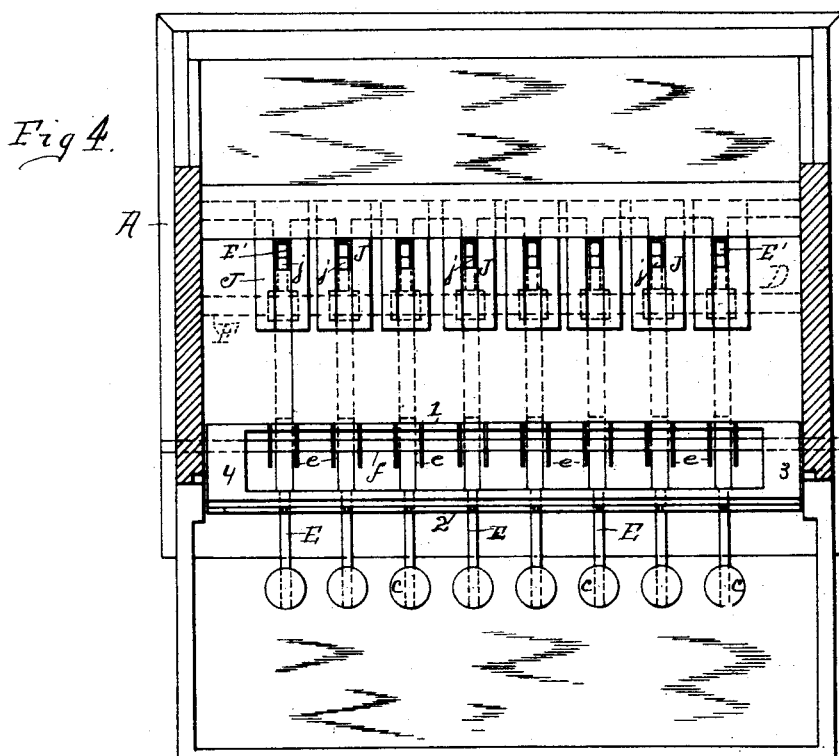
Figure 5:
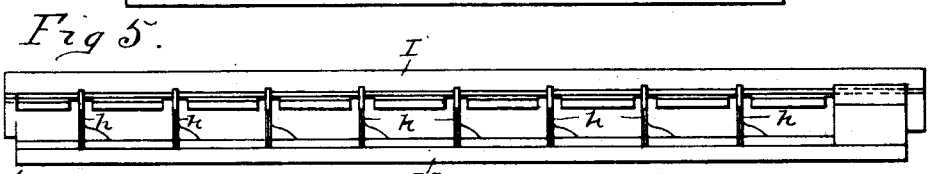
Figure 6:
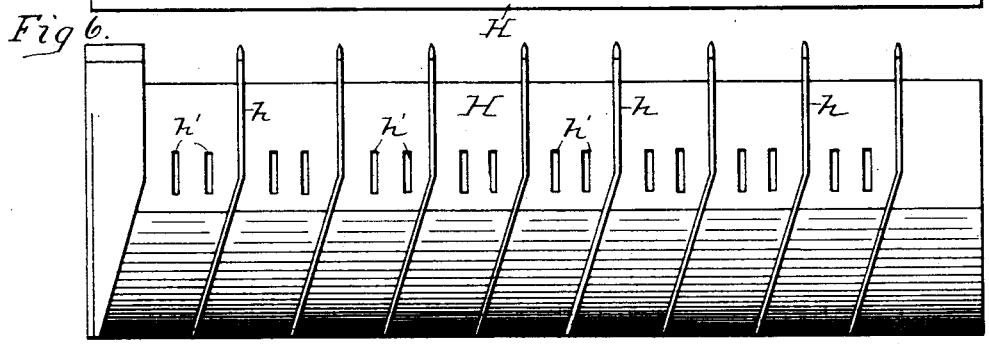
Figure 7:
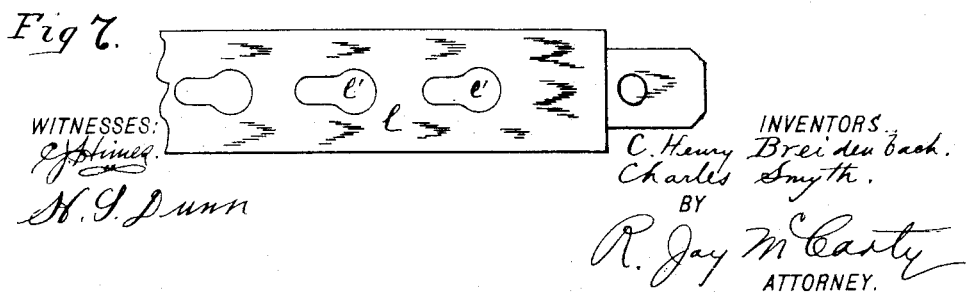
Figure 11:
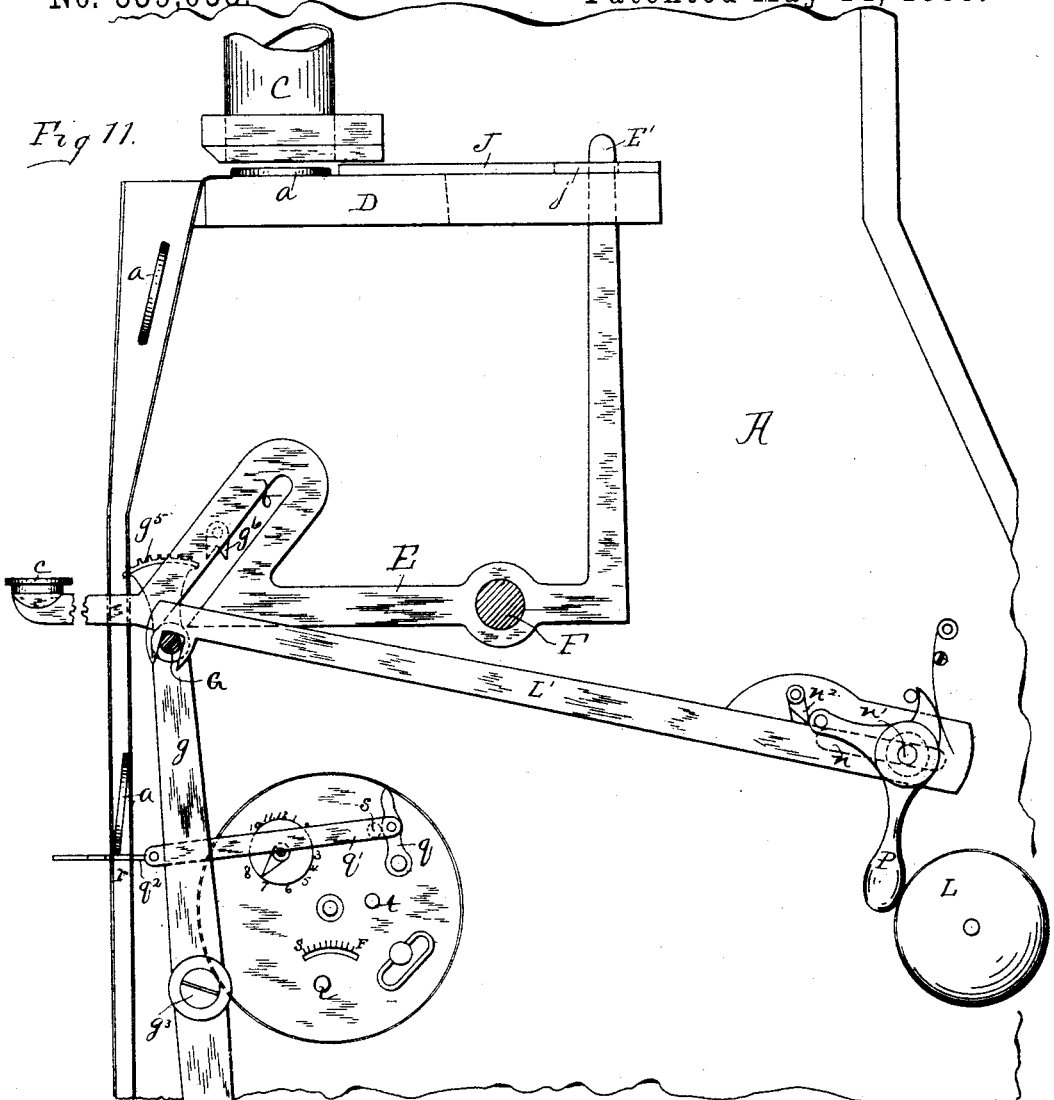
Figure 10:
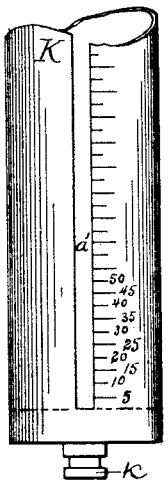

Figure 1 is a front elevation of the machine. Fig. 2 is a front elevation, partly in section, and some of the casing removed to obtain a view of the inclosed mechanism; Fig. 3, a vertical section through the center of the machine; Fig. 4, a transverse section on the line $x\,x$ of Fig. 3. Fig. 5 is a top view of parts of the chute wherein the chips are exposed; Fig. 6, a plan view of one of the parts shown in Fig. 5; Fig. 7, a detached detail view of the transverse locking-bar; Fig. 8, a detached detail side elevation of the vibrating frame and lever, the lower portion of the latter broken off; Fig. 9, a detached detail plan view of one of the chip-slides; Fig. 10, a detached detail view of one of the chip-cylinders, showing the scale thereon and having its upper part broken off; Fig. 11, an enlarged side elevation with parts of the casing broken away, showing clock and alarm mechanisms.

The casing is indicated by A, and of course may be of any shape or design suitable for the purpose. B is the hopper located in the upper end of said casing, and C represents a series of tubes or cylinders extending from the hopper to a point in proximity to the upper surface of a transverse plate attached to the sides of the casing. The hopper and cylinders C are designed to hold any desirable number of chips ($a$) of composition, celluloid or any suitable material, and preferably of circular form, and of a size to prevent their binding in the cylinders. The space between the upper surface of the plate D and the lower extremity of the cylinders is slightly greater than the thickness of one of said chips, so that when the bottom chip rests upon the plate D it may be free from the lower end of the cylinder in order that its removal may be effected in a manner that will be hereinafter described.

E is a series of key levers having their fulcra on a shaft F journaled transversely in the sides of the casing. The shape of these levers is substantially as is shown in Figs. 3 and 11. Near the middle portion of these levers an inclined slot $b$ is formed, and on the outer extremity of said key-lever, a finger tip ($c$) is placed upon which is indicated the numeral representing the value of the same.

$d$ is a spring attached to a transverse bar $d'$ and to the key levers to maintain them in position to be operated.

G is a vibrating rod attached to vertical levers $g$ and $g'$, and forming therewith, a vibrating frame. The levers $g$ and $g'$ have bearing lugs $g^3$ and $g^4$ journaled in the sides of the casing. It will be noted in Fig. 3, that the rod G is mounted in the front portion of the casing (as is the major portion of the mechanism) in a manner to bring it in line with the lower extremity of the slot (b) so that when a key-lever is depressed said rod is vibrated by coming in contact with the slot. A vibrating frame to catch the chips as they are removed from the tubes consists of end brackets 3 and 4 joined by horizontal pieces 1 and 2. The former, that is, piece 1, is provided with a row of pins (e) upon which the chips first lodge when removed from the tubes C by the slides J. The piece 2 of this frame, forms a ledge for the chips to rest upon after they are displaced from said pins, and from whence they are exposed.

($i^2$) designates a spring attached to the vibrating frame, and to any suitable part of the casing to draw in said frame, after the return of the key-lever from the downward stroke and thereby effect a dislodgment of the chips from the pins (e). Upon the depression of a key-lever, a chip is moved out from the bottom of the tube C and at the same time the vibrating frame consisting of the parts 1, 2, 3 and 4 is vibrated by the horizontal part of the arm $g^2$ sliding in contact with the lug 1ª. The pins (e) are thereby forced through the opening (h') in the plate H, and the spring ($i^2$) is put under tension. The chip which is thus removed from the tube C is then caught by the pin (e), and the chip which has been resting on the ledge 2 is dropped into the chute (e'). Upon the release of the key-lever the arm $g^2$ assumes the position shown in Fig. 8, where it will be noted the lug (1ª) is brought in contact with the beveled end of said arm. The spring ($1^2$) vibrates the frame inwardly and consequently releases the chip resting on the pin (e), and at the same time the ledge 2 comes into position to catch said chip and holds it until the next operation of the key-lever.

(f) is a transverse rod with its ends loosely journaled in the casing, upon which said vibrating frame is mounted.

H is a plate mounted on an incline in the front of the vibrating frame, the bottom horizontal edge of which rests in a longitudinal groove in the ledge 2 of said frame, against which the chips rest while supported on said ledge. This plate is correspondingly moved by the vibrations of said frame. The upper horizontal portion of the plate terminates on a plane coincident with the upper surface of the plate D and provides a surface for the chips to slide upon, and said plate is further provided with a series of ribs (h) projecting from its outer surface, and a series of slots (h') through and in which the pins (e) project and have play.

I is an indicating plate consisting of a plate of glass I' or other transparent material inclosed in a wooden or metal frame and mounted in the front of the plate H and forming a portion of the inclosing case as seen in Fig. 1. This glass presents a back-ground and circles of contrasting colors, say a background of black with transparent circles, or the circles may be formed by omitting to apply the back-ground to such portions of the glass. In each of these circles any desired numerals may be placed of a color or design contrasting with that of the circle; said numerals representing certain values in money and corresponding in function to an indicator tablet.

J represents a series of rectangular slides with inclosed slots (j) through which the ends E' of the key levers E project. These slides operate horizontally on the plate D and pass back and forth beneath the tubes C leading from the hopper B, and have flanges or guideways (i) projecting from the surface of plate D.

e' represents a series of chutes with flaring mouths, attached to the front of the casing. The lower extremities of these chutes lead to a corresponding series of tubes or cylinders K placed vertically in seats in the base of the casing. These tubes are constructed of any suitable material having a degree of transparency sufficient to enable a view of the contents. They are also constructed with a longitudinal opening a', and a graduated scale on the side of said opening, the design and object of which are to indicate the amount of cash as represented by the stack of chips that may be within said tube.

l is a transverse locking bar for preventing any tampering with the tubes. This bar is provided with a series of openings l' substantially as shown in Fig. 7. The part of said openings having the widest diameter admits of the penetration of the button k on an end of the tube K, when the bar is then slid to inclose said button by the smallest part of said opening and in that position locked by any suitable means. A small pad-lock and a staple may be employed for this purpose.

Briefly describing the operation, the tubes leading from the hopper are first filled with chips after which the supply may extend to the hopper as described. By virtue of their specific gravity, the chips will fall to rest one at a time in contact with the plate D, the space between the upper surface of said plate and the lower extremity of the tubes admitting of only one chip leaving the tubes at a time. A depression of a lever causes the slide J to push out the chip so resting. While the lever is being pressed to its lowest limit, the chip has gravitated to the point shown in Fig. 3, where it lodges on the pins (e.) The upward return of said lever vibrates the frame sufficiently to dislodge the chip from said pins when a further gravitation is made to the point indicated by (o), Fig. 3, or to a point immediately in the rear of the circular space on the plate H, where the contrasting of the chip affords a clear view of the figure indicated on said space. The chip rests in this position on the lower horizontal ledge 2, of the vibrating frame, until the operation of another key lever vibrates said frame to dislodge the chip from its indicating position and permit it to gravitate through the chute (e') to its respective cylinder K; the depression of said key at the same time causing its own chip to gravitate from the plate D.

It is in order to state that each key lever is provided with its own system or compartment,—that is to say, there are separate tubes, slides, guide-ways, cylinders, &c., for each lever, so partitioned and arranged that the gravitation of any chip is not interfered with, or does not traverse the route of any other chip.

We provide against the operation of one key before the operation of another is completed by constructing the upper end of the lever $(g)$ with a ratchet as at $(g^5)$ and depending a pawl $g^6$ to the side of the casing to engage with said ratchet. See Fig. 11. When a lever is but partly depressed, this pawl prevents its return until a full stroke is made. Fig. 11 also shows alarm-sounding mechanism we employ in our apparatus, consisting of a bell L attached to the casing, a lever L' with jaws at one end inclosing the vibrating rod G and thereby subjected to movement by said rod. The other end of said lever is provided with a slot $(n)$ by which it is mounted on a lug $(n')$ and upon which lug the hammer P is pivoted.

$n^2$ is a dog fixed to the lever L' by which the hammer is operated to sound the bell.

Further mechanism is provided, and shown in Fig. 11 for ascertaining the time of arrival in the morning, of the person having charge of the store or other place. This consists in providing an extra compartment or division, for dropping a chip, through the agency heretofore described. The lever, tube, chute, &c., are located at one end of the machine, and instead of the chip being compelled to stop twice on its trip, it only stops once. This attachment is operated by an ordinary alarm clock Q having its face exposed through the side of the casing.

$q$ is a crank arm fixed to the alarm winding stem.

$q'$ is an arm connected loosely at one end to said crank arm, and at the other end to a slide $q^2$ with an opening in a part thereof. This slide is subjected to a horizontal movement by the arm in a transverse slot in the chute $(r)$ through which the chip drops. The normal position of the slide $(q^2)$ with reference to the chute $(r)$ is shown in Fig. 11 where the slot in the slide is passed entirely across said chute, and a chip is resting upon the solid part of said slide.

$s$ and $t$ are stops on the rear of the clock, prescribing the limit of movement of the arm $q$. As appears the hand of said clock points to 7. This implies that the arm $q$ will reach the stop $t$ at seven o'clock, at which time the opening in the slide $q^2$ will have reached a position within the chute so that a chip having been discharged to said slide a few minutes before seven o'clock, will rest on said slide as shown in Fig. 11, until the opening comes in a line with the chip, when the chip, will drop therethrough to a receptacle arranged therefor in the machine, and thus it will be shown that the person was on time.

The mechanism for locking and unlocking the till is shown in Figs. 2 and 3 and consists of a detent $u$ pivoted to an arm $u'$ fixed to the inside of the lid. The lower end of the lever $g$ is provided with a hook $u^3$ that has a normal engagement with said detent. A spring $u^2$ attached to the casing in the rear of the lid exerts pressure against the arm $u'$ causing it to open to dotted lines, Fig. 3, when the detents are released from engagement.

The means adopted for preventing the operation of any of the key levers E, while the lid of the drawer is open, consists of an angular lever V, mounted on a bearing lug $v'$ in the side of the casing. The respective ends $v^2$ and $v^3$ of this lever terminate at right angles. When the lid is opened said lever occupies the position shown in dotted lines. The removal of the arm $u'$, against which the end $v^3$ bears, permits this. At this junction the depression of a key lever E will cause the lug $e^2$ on the lever $g$ to come against the end $v^2$ of the angular lever, and thereby bind said levers.

It will be readily seen that some changes may be made in the location and arrangement of the chip receptacles without altering the other parts of the apparatus. For instance, the hopper, and the tubes $k$ may be dispensed with and the numerical scale by which the computing is done, may be placed on the upper tubes C, in which case it would be necessary to increase the length of said tubes. A common receptacle to catch the chips, in this case, may be placed in the bottom of the machine in place of the tubes $k$. As shown and described, the chips are computed as they are added to the tubes $k$, while in the other instance, they would be computed as they were discharged from the tubes C.

Having thus described our invention, we claim—

1. In a cash register, the combination with the casing provided with a hopper and tubes leading therefrom; of a series of angular key-levers provided with inclined slots in their horizontal portion, a vibrating frame upon which chips or checks are supported when discharged from said tubes, the plate H mounted on and in the front of said frame, the indicating plate I mounted in the front of plate H, said indicating plate having a center piece of transparent material, and said center piece having circles containing numerals corresponding with the value of the key-levers, and which are adapted to be indicated by a chip of contrasting color being supported on the vibrating frame, as herein specified.

2. The combination of the angular key-levers provided with slots $(b)$, slides operated by the vertical ends of said key-levers, the vibrating rod G mounted on levers $g$ and $g'$ operated by the slotted portion of said key-levers, an arm attached to one of said levers $(g)$, a vibrating frame adapted to support chips or checks, operated by said arm, the plate H, and the indicating plate I, a series of chutes $e'$ and cylinders K arranged as herein specified.

3. In a cash register, the combination of a series of angular and slotted key-levers as herein described, a vibrating rod mounted on vertical levers below said key-levers and in the path of the slotted portion thereof, one of said vertical levers provided with a lug $e^2$, the angular lever V with ends $v^2$ and $v^3$, the arm $u'$ attached to the cover of the till, by means of which the operation of a key-lever is prevented.

4. In a cash register, the combination with the main shaft; of a series of key levers fulcrumed on said shaft, said levers having their rearward ends terminating at right angles and uniform slots formed in their bodies, a vibrating rod, uniformly operated by said slots, and a series of slides operated by the right-angled portions of said key levers, as herein described.

5. In a cash register, the combination of a series of tubes adapted to contain checks or chips, a series of slotted slides below said tubes, and adapted to move said chips, a vibrating frame, a series of angular and slotted key levers adapted to simultaneously operate said slides, and the vibrating frame, whereby a chip is removed from the tubes, and maintained in an exhibiting position, substantially as described.

6. In a cash register, the combination with the casing having a hopper located therein, of a series of tubes leading from said hopper, a series of slides below said tubes, the vibrating rod G, and the vertical levers $g$ and $g'$ connected therewith, the arm $g^2$ connected with the lever $g$, a series of slotted and angular key levers by means of which the slides, and the vibrating rod G, and levers $g$ and $g'$ are operated, a vibrating frame upon which the chips may lodge, operated by the arm $g^2$, and a series of tubes to receive said chips when released from said frame, as herein described.

7. In a cash register, the combination with the casing having a series of tubes located therein, adapted to contain checks or chips; of a series of slides below said tubes, adapted to move said chips, the vibrating frame provided with pins ($e$), and a ledge 2, upon which the chips so moved, are alternately supported and exposed, a transparent plate bearing figures in contrasting color, and behind which the chips rest, when supported on said frame, the transverse rod G, the vertical levers $g$ and $g'$ attached thereto, and the arm $g^2$, and the key levers, herein described, for simultaneously operating said rod and slides.

8. The combination of the key levers provided with inclined slots in their body, and their rearward ends terminating at right angles to said body portion, the transverse rod G, and the vertical levers $g$ and $g'$, the former provided with teeth $g^5$, and arm $g^2$, said rod and levers forming a vibrating frame uniformly operated by said key levers, a ratchet pawl pivoted adjacent to said teeth, whereby said vibrating frame is compelled to reach the limit of movement before resuming its former position, and a vibrating frame upon which the chips are supported, said frame being provided with a cam lug $1^a$ to engage with the arm $g^2$, and also provided with pins ($e$) as herein described.

9. In a cash register, the combination with the casing provided with a series of tubes to contain checks, a series of slides adapted to move under said tubes to remove the checks therefrom, a vibrating frame to catch said checks after said removal, a transverse rod mounted on upright levers and adapted to vibrate therewith, the lever $L'$ attached to said transverse rod, the bell hammer P operated by said lever $L'$, the bell L adjacent to said hammer, the dog $n^2$ mounted on the lever $L'$, and a series of angular and slotted key-levers, the operation of any one of which, will simultaneously remove a check from its respective tube, indicate one previously so removed, release one previously so indicated and permit it to gravitate to its receiving tube, and operate said alarm mechanism, substantially as herein described.

In testimony whereof we have hereunto set our hands this 17th day of October, 1893.

C. HENRY BREIDENBACH.
CHAS. SMYTH.

Witnesses:
R. J. McCARTY,
H. L. DUNN.